United States Patent
Murari et al.

(10) Patent No.: US 6,289,732 B1
(45) Date of Patent: Sep. 18, 2001

(54) HERMETICALLY SEALED SEMICONDUCTOR INERTIAL SENSOR

(75) Inventors: Bruno Murari, Monza; Paolo Ferrari, Gallarate; Benedetto Vigna, Potenza, all of (IT)

(73) Assignee: SCS Thomson Microelectronics S.r.l., Agrate Brianza (IT)

( * ) Notice: Subject to any disclaimer, the term of this patent is extended or adjusted under 35 U.S.C. 154(b) by 0 days.

(21) Appl. No.: 08/987,255

(22) Filed: Dec. 9, 1997

(51) Int. Cl.[7] ........................................... G01P 1/02
(52) U.S. Cl. .............................. 73/493; 257/704
(58) Field of Search ................... 73/493, 504.15, 73/514.15, 514.16, 514.24, 514.29, 514.32, 514.33, 514.34, 514.36, 514.37, 514.38, 431, 866.5, 1.38, 721, 718, 727; 257/704

(56) References Cited

U.S. PATENT DOCUMENTS

| | | | |
|---|---|---|---|
| 4,314,225 | * 2/1982 | Tominaga et al. | 73/721 |
| 4,399,707 | * 8/1983 | Wamstad | 73/727 |
| 4,528,583 | 7/1985 | te Velde et al. | 257/529 |
| 4,670,092 | * 6/1987 | Motamedi | 73/720 |
| 5,111,693 | 5/1992 | Greiff | 73/514 |
| 5,164,328 | 11/1992 | Dunn et al. | 437/54 |
| 5,168,344 | * 12/1992 | Ehlert et al. | 257/693 |
| 5,259,247 | * 11/1993 | Bantien | 73/718 |
| 5,285,690 | * 2/1994 | Koen et al. | 73/727 |
| 5,438,859 | * 8/1995 | Yamashita et al. | 73/1.38 |
| 5,650,567 | 7/1997 | Ueda et al. | 73/493 |
| 5,719,334 | * 2/1998 | Parsons | 73/514.32 |
| 5,723,904 | * 3/1998 | Shiga | 257/698 |
| 5,750,926 | * 5/1998 | Schulman et al. | 257/698 |
| 5,864,063 | 1/1999 | Otani et al. | 73/514.32 |

FOREIGN PATENT DOCUMENTS

| | | |
|---|---|---|
| 96103569.8 | 7/1996 | (EP) . |
| 0773443 | 5/1997 | (EP) . |
| WO 96/39632 | 12/1996 | (WO) . |

* cited by examiner

Primary Examiner—Helen Kwok
(74) Attorney, Agent, or Firm—Theodore E. Galanthay; Allen, Dyer, Doppelt, Milbrath & Gilchrist, P.A.

(57) ABSTRACT

An inertial sensor has a sensing element formed on one surface of a chip of semiconductor material and which is movable with respect to the chip. The sensing element is enclosed in a sealed hollow structure, in which the hollow structure includes a metal wall disposed on the surface around the sensing element, and a closure plate fixed to the wall.

12 Claims, 1 Drawing Sheet

HERMETICALLY SEALED SEMICONDUCTOR INERTIAL SENSOR

FIELD OF THE INVENTION

The present invention relates to electronic devices, and, more particularly, to an hermetically sealed semiconductor inertial sensor.

BACKGROUND OF THE INVENTION

Inertial sensors are used in various applications, such as, for example, in the automobile field to control various devices, such as air bags, anti-lock braking systems (ABS), active suspensions, or in other fields, such as consumer electronics, electronic processors and the like. Inertial sensors are operable to measure a mechanical quantity, for example, related to a movement of the sensor (such as its acceleration) and to produce an output signal as a function of this quantity. One particular type of inertial sensor, which is extremely small and very reliable, is that made on a microscopic scale (micro sensors) on a chip of semiconductor material. Inertial sensors of this type are based on the displacement of a sensing element, movable with respect to the chip, the movement of which is converted into a suitable electrical signal. Preferably, a circuit for processing the output signal produced by the sensor should also be integrated onto this chip.

In semiconductor inertial sensors the sensitive element must be suitably isolated by enclosing it in a sealed structure in such a way as to ensure that it operates in a controlled environment. This allows the sensitive element, which has a very small mass, to move with low resistance and minimum damping to guarantee good sensitivity of the sensor. Moreover, the circuit for processing the output signal from the sensor requires encapsulation in a suitable container or package which protects the processing circuit from the external environmental conditions thereby guaranteeing its correct operation.

One method for hermetically enclosing a semiconductor inertial sensor includes encapsulating it with the associated circuitry in a sealed container, such as, for example, a ceramic or metal container. This technique, however, is extremely expensive, which converts into a high cost of the finished product because the cost of the container represents the major proportion of the overall costs.

A different known technique includes producing a hollow structure on the microscopic scale (micro cavity) to house the sensing element. This isolating method involves the micro-working of a wafer of silicon or glass which is then connected to the wafer on which the inertial sensors are formed, for example, by means of an anodic bonding technique. This method makes it possible to use standard plastic containers of low cost for encapsulating the final product. The above described known arrangement is nevertheless rather expensive and has the disadvantage of not allowing the sensor and the associated processing circuitry to be integrated onto the same chip so that the connection step requires that the surfaces to be joined are perfectly planar (with a peak-to-trough roughness of the order of tens of Å)

SUMMARY OF THE INVENTION

In view of the foregoing background, it is therefore an object of the present invention to provide an hermetically sealed inertial sensor which is simple in construction, reliable and economical to manufacture. This and other objects of the present invention are provided by an inertial sensor comprising a chip of semiconductive material, a movable sensing element on a surface of the chip; and a hollow structure enclosing the sensing element. More particularly, the hollow structure preferably comprises a metal wall disposed on the surface of the chip, and a closure plate fixed to the metal wall.

The hermetic sealing of the inertial sensor of the present invention can be made at the wafer level without requiring micro-working of a further silicon or glass wafer and subsequent connection operations. This inertial sensor makes it possible also to integrate the processing circuitry onto the same chip and, possibly, to use a plastic container which is therefore extremely economical, to encapsulate the final product.

BRIEF DESCRIPTION OF THE DRAWING

Further characteristics and advantages of the inertial sensor according to the present invention will become apparent from the following description of a preferred embodiment thereof, given by way of indicative and non-limitative example with reference to the sole attached FIGURE (FIG. 1) which illustrates the sensor in accordance with the invention in a partially-sectioned schematic view.

DETAILED DESCRIPTION OF THE PREFERRED EMBODIMENTS

Figure 1:
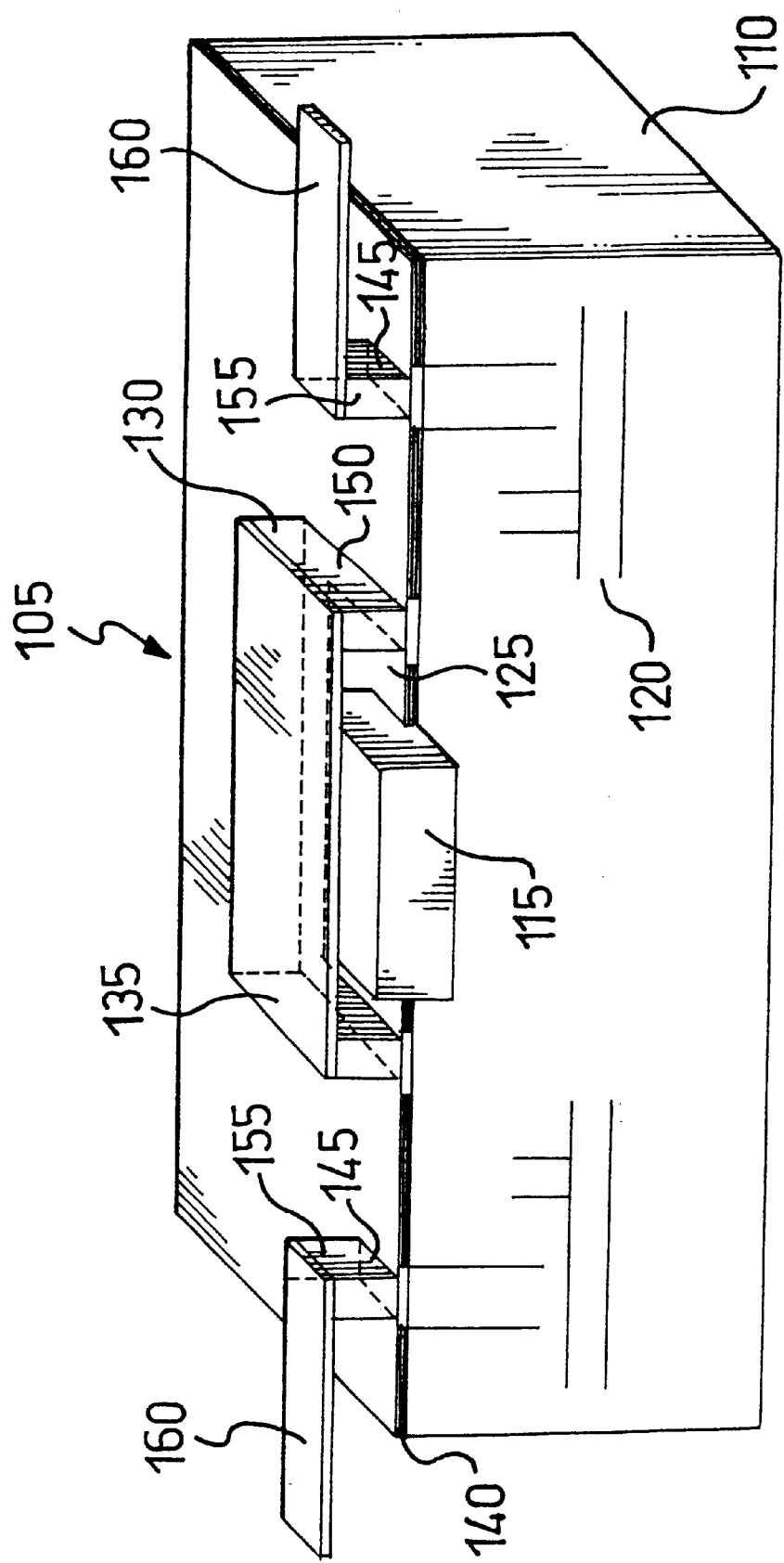

The sole FIGURE shows an inertial sensor 105 made on a chip 110 of semiconductor material, typically silicon. The inertial sensor 105 includes a sensing element 115 provided by a micro-electromechanical structure (or MEMS), which has a so-called seismic mass, anchored to the chip 110 at pre-established points and movable with respect thereto, the movement of which is converted into a suitable electrical signal. For example, the sensing element 115 provides a first electrode of a capacitor, and the second electrode of which is provided on the chip 110.

The movement of the sensing element 115 causes a variation in the capacitance of the capacitor which, in turn, is measured by a suitable circuit. The inertial sensor 105 is, for example, an accelerometer, an angular velocity sensor (gyroscope) or a vibration sensor, in which the sensing element 115 moves by the effect of the linear or angular acceleration, or the angular velocity of a system (for example, a motor vehicle) on which it is mounted, making it possible to measure the desired physical quantity. Alternatively, the inertial sensor 105 is of resonant type in which the sensing element 115 vibrates at a frequency which varies as a function of the quantity to be detected. Advantageously, a circuit 120 for processing and amplifying the output signal produced by the sensor 105 is also integrated on the chip 110. Typically, a large number of sensors 105 and processing circuits 120 are produced in a plurality of identical areas of semiconductor wafer material. These are subsequently separated by a suitable cutting operation to form the individual chips 110.

Each sensing element 115 is hermetically sealed within a hollow structure 125 with a controlled atmosphere, containing for example air or nitrogen, typically at a pressure lower than atmospheric pressure. Preferably the sensing element 115 is vacuum sealed within the hollow structure 125. In the inertial sensor 105 of the present invention the hollow structure 125 is laterally delimited by a metal wall (bump) 130 disposed on the upper surface of the plate 110 around the sensing element 115. The hollow structure 125 is closed from above by means of a plate 135, having a size at least equal to that of the cavity 125, which is fixed (for example by welding or glueing) onto the wall 130.

The formation of the wall 130 can be achieved by using various techniques. In one embodiment of the present invention, on an upper surface of the chip 110, which is clad with an insulating layer 140 (typically silicon dioxide) with known techniques of deposition, masking and etching, conductive areas (pads) 145 are formed in contact with the processing circuitry 120. During this phase there is also formed a conductive frame 150 (for example of aluminium) which surrounds the sensing element 115 and the shape of which (for example circular or rectangular) varies dependent on the form of the sensing element 115. Note that the formation of the conductive frame 150 is not necessary in some processes for formation of the wall 130.

Onto the conductive areas 145 and on the conductive frame 150 there is therefore grown a layer, respectively 155 and 130, provided by a welding alloy or by another material such as nickel, covered with a layer of welding alloy. The height of the wall 130 must be greater than that of the sensing element 115, for example, 10 $\mu$m. The present invention lends itself to being put into practice using different types of welding alloys. For example, if the material used to fix the closure plate 135 onto the wall 130 is copper, the welding alloy is advantageously provided by nickel-gold in such a way as to form a eutectic alloy with the copper.

The metal layers 155, 130 may be made by means of an electroless growth process. Alternatively electroplating, evaporation, dispensing and the like are processes that may be used. In particular, a layer of more noble metal, for example zinc, is deposited on the conductive areas 145 and on the aluminium conductive frame 150, which impedes the formation on the aluminium of oxide and hydroxide layers. The wafer is then immersed in a self-catalytic chemical solution for the growth of a layer of nickel. Finally, a thin layer of gold is deposited, which protects it from oxidation and improves the quality of the welding. The above described process is particularly economical and flexible in that it is compatible with batch working of the wafer and does not require any additional screens.

In one embodiment of the present invention, the sealing of the cavity 125 is achieved by using a polymeric layer, for example a sheet of polyimide (such a Kapton) which supports a matrix of metal sealing plates 135, for example of copper. The polymeric support layer is disposed on the wafer and the various metal sealing plates 135 are welded to the corresponding walls 130, for example, by a heat compression technique or by laser heating. Subsequently, the support layer is removed (by suitable solvents) and the process proceeds then to the stage of cutting the wafer and the final encapsulation stage (described hereinbelow). Alternatively, the closure of Athe hollow structure 125 is effected after the chip 110 has been cut and fixed to a suitable frame for the final encapsulation phase. In this case the polymeric support layer also includes tracks 160 for electrical connection to the metal layers 155 of the processing circuitry. Note that in this embodiment of the present invention the movable element is sealed in a metal cavity and is therefore advantageously screened from electromagnetic interference.

In a different embodiment of the present invention the closure of the cavity 125 is achieved by using a layer of copper which supports a matrix of closure plates 135 of Kapton and a third layer of corresponding copper welding frames. This structure is disposed on the wafer and the copper frames are welded to the corresponding walls 130 in such a way as to fix the closure plates 135 to these. Subsequently the copper support layer is removed by means of an electrolytic stripping process.

In an alternative embodiment of the present invention, the walls 130 are formed completely or partly on a support layer, for example ceramic or Kapton (with conductive frames). In this case the support layer is disposed on the wafer and the walls 130 are fixed to the upper surfaces of the chip 110, for example welded to the corresponding frames 150 or to further (lower) walls formed on the chip 110. Typically the support layer is made with apertures which allow access to the corresponding conductive areas of the processing circuitry in the final encapsulation phase. For example, the support layer may be provided by a plurality of closure plates joined by means of interconnection sections, which are cut during the wafer cutting phase. This embodiment offers the advantage of reducing the problems of working the wafer due to the presence on its upper surface of the walls around the sensing elements.

The present invention also lends itself to being put into practice using a metal wall 130 not provided by a welding alloy. For example, the metal walls 130 are made of copper and are grown on a support layer of Kapton. On each metal wall 130 there is then disposed a frame of adhesive material, for example acrylic or epoxy; typically a non-polymerised adhesive is involved which reverts with temperature. This structure is disposed on the wafer and the adhesive frames are stuck around the sensing elements on the insulating layer 140 which covers the upper surface of the chip 110. Similar considerations apply if the metal wall 130 is grown on the upper surface of the chip 110 and the closure plate 135 is secured thereto by adhesive.

When the operations on the wafer and the associated testing are completed the chips 110 are separated with a cutting operation. Each chip 110 is then fixed to a suitable frame by welding with a low-melting alloy, for example lead-tin, or by glueing with a suitable adhesive. In the embodiment illustrated in the drawing, the tracks 160 connected to the conductive areas 145 of the processing circuitry by means of the metal layers 155 provide the connection electrodes for the device.

Alternatively, the conductive areas 145 are connected by means of thin metal wires, for example of gold to corresponding electrodes (wire bonding). Typically, the metal wires are welded with a low melting alloy, on the one hand, to the conductive areas 145 and on the other to the internal ends of the electrodes, with a so-called thermosonic process which provides for the simultaneous application of heat and ultrasound. The assembly thus formed can be used directly in cases in which it is inserted into a controlled environment system, such as hard-disc drivers.

Alternatively, the assembly is mounted in a suitable mould into which a plastics material is injected in liquid state, for example a thermosetting epoxy resin. After polymerisation of the resin there is obtained a structure which includes an insulating body in which the above-described elements are embedded and from which project the electrodes for connection to an external circuit.

What is claimed is:

1. A monolithic integrated circuit inertial sensor comprising:
   a monolithic integrated circuit substrate comprising semiconductor material;
   an inertial sensing element on a surface of said substrate and movable with respect thereto; and
   a hollow structure enclosing said inertial sensing element, said hollow structure comprising a metal wall disposed on the surface of said substrate around said inertial sensing element, said metal wall having a height at least as great as a height of said inertial sensing element, and a closure plate fixed to said metal wall.

2. A monolithic intergrated circuit inertial sensor according to claim 1, wherein said metal wall compreses a welding alloy.

3. A monolithic intergrated circuit inertial sensor according to claim 1, wherein said closure plate comprises a metal material.

4. A monolithic intergrated circuit inertial sensor according to claim 1, wherein said closure plate comprises a polymeric material.

5. A monolithic intergrated circuit inertial sensor according to claim 1, further comprising a processing circuit formed in said substrate.

6. A monolithic intergrated circuit inertial sensor according to claim 1, further comprising a plastic container encapsulating said substrate, said sensing element, and said hollow structure.

7. A monolithic integrated circuit inertial sensor comprising:

a monolithic integrated circuit substrate comprising semiconductor material;

an inertial sensing element on a surface of said substrate and movable with respect thereto;

a hollow structure enclosing said inertial sensing element and connected to said substrate, said hollow structure comprising a wall disposed on the surface of said substrate about said inertial sensing element, and a closure plate on said wall; and a processing circuit in said substrate and connected to said inertial sensing element.

8. A monolithic intergrated circuit inertial sensor according to claim 7, wherein said wall comprises metal.

9. A monolithic intergrated circuit inertial sensor according to claim 7, wherein said wall comprises a welding alloy.

10. A monolithic intergrated circuit inertial sensor according to claim 7, wherein said closure plate comprises a metal material.

11. A monolithic intergrated circuit inertial sensor according to claim 7, wherein said closure plate comprises a polymeric material.

12. A monolithic intergrated circuit inertial sensor according to claim 7, further comprising a plastic container encapsulating said substrate, said sensing element, and said hollow structure.

* * * * *

UNITED STATES PATENT AND TRADEMARK OFFICE
CERTIFICATE OF CORRECTION

PATENT NO.    : 6,289,732 B1
DATED         : September 18, 2001
INVENTOR(S)   : Bruno Murari, Paolo Ferrari and Benedetto Vigna It is certified that error appears in the above-identified patent and that said Letters Patent is hereby corrected as shown below:

<u>Title page,</u>
Item [73], delete "SCS Thomson Microelectronics S.r.l.," insert -- SGS Thomson Microelectronics S.r.l., --
Item [30] insert -- Foreign Application Priority Data
                Dec. 24, 1996  (EP)…………………………..96830654.8 --

<u>Column 3,</u>
Line 44, delete "(such a Kapton)" insert -- (such as Kapton) --
Line 53, delete "of Athe hollow" insert -- of the hollow --

<u>Column 5,</u>
Lines 6, 9, 12, 15 and 18, delete "intergrated" insert -- integrated --
Line 7, delete "compreses" insert -- comprises --

<u>Column 6,</u>
Lines 11, 13, 15, 18 and 21, delete "intergrated" insert -- integrated --

Signed and Sealed this

Twenty-seventh Day of August, 2002

Attest:

JAMES E. ROGAN
*Director of the United States Patent and Trademark Office*

*Attesting Officer*